United States Patent
Reinert

(10) Patent No.: US 7,140,789 B1
(45) Date of Patent: Nov. 28, 2006

(54) REMOTE CONTROLLED PAN HEAD SYSTEM FOR VIDEO CAMERAS AND ITS METHOD OF OPERATION

(76) Inventor: Jason A. Reinert, 250 N. Bethlehem Pike, Ambler, PA (US) 19002

( * ) Notice: Subject to any disclaimer, the term of this patent is extended or adjusted under 35 U.S.C. 154(b) by 9 days.

(21) Appl. No.: 10/865,769

(22) Filed: Jun. 14, 2004

(51) Int. Cl.
*G03B 17/00* (2006.01)
*H04N 5/232* (2006.01)

(52) U.S. Cl. .................. 396/428; 396/58; 348/211.99; 348/211.2; 348/211.7

(58) Field of Classification Search ............. 348/211.9, 348/207.11, 211.99, 211.1, 211.2, 211.4, 348/211.7, 211.8, 211.14, 64, 373–376; 396/56, 396/58, 427, 428; 352/242, 243
See application file for complete search history.

(56) References Cited

U.S. PATENT DOCUMENTS

| | | | | |
|---|---|---|---|---|
| 5,434,614 A | * | 7/1995 | Dainty | ........................ 348/64 |
| 5,570,177 A | * | 10/1996 | Parker et al. | .......... 356/139.06 |
| 5,719,622 A | * | 2/1998 | Conway | ................... 348/211.8 |
| 6,714,729 B1 | * | 3/2004 | Sugiura et al. | ................ 396/19 |
| 2002/0008759 A1 | * | 1/2002 | Hoyos | ......................... 348/211 |
| 2002/0018124 A1 | * | 2/2002 | Mottur et al. | ................ 348/211 |
| 2002/0191080 A1 | * | 12/2002 | Terada et al. | ............. 348/207.1 |
| 2003/0011685 A1 | * | 1/2003 | Oka et al. | ................. 348/211.2 |

* cited by examiner

*Primary Examiner*—W. B. Perkey
*Assistant Examiner*—Rishi Suthar
(74) *Attorney, Agent, or Firm*—LaMorte & Associates

(57) ABSTRACT

A pan head system for selectively attaching a video camera to a stand that enables the video camera to be operated and panned from a remote location. The pan head system includes a camera mount for engaging a video camera. The pan head system also has a stand mount for engaging a support stand. A motorized orientation mechanism is disposed between the camera mount and the stand mount for selectively varying an orientation of the camera mount relative the stand mount. A user interface is provided for controlling the motorized orientation mechanism. The user interface is remote from the motorized orientation mechanism and communicates with the motorized orientation mechanism via a communications link.

16 Claims, 5 Drawing Sheets

REMOTE CONTROLLED PAN HEAD SYSTEM FOR VIDEO CAMERAS AND ITS METHOD OF OPERATION

BACKGROUND OF THE INVENTION

1. Field of the Invention

In general, the present invention relates to pan heads that are used to change the direction in which a camera is pointing while the camera is in operation. More particularly, the present invention relates to automated camera panning systems that are operated by remote control.

2. Description of Related Art

Video cameras are devices that are used to produce video images. The video images generated by the video camera can either be viewed live or recorded for later viewing. There are two primary uses for video cameras. One use is surveillance. The other use is for personal recording of events.

When a video camera is used for surveillance. The video camera is typically mounted at place of interest in order to view activity at that place of interest. For instance, surveillance cameras are used by stores, banks and casinos so that a video record will exist if ever there is a theft or an attempted theft. When a video camera is used for surveillance, the video camera itself is seldom used to directly record the viewed image. Rather, video cameras are connected with cables to remote recording devices that record images generated by the cameras. Since the surveillance cameras do not directly record, they can be made very small and inconspicuous.

Surveillance video cameras are sometimes mounted to motorized pan heads. The pan heads are often controlled by the security personnel who are observing the images being generated by the surveillance video cameras. In this manner, a security officer can cause a particular video camera to zoom in on a particular person or event and the surveillance video camera can be caused to follow that person or event across a predetermined range of view.

When a video camera is used for recording personal events, the operation of the video camera is very different. A video camera that is configured to record personal events is typically a mobile handheld camera. Furthermore, the image viewed by the camera is recorded directly by the camera on a tape or magnetic disk that is located within the camera. As such, video recording cameras are generally larger and bulkier than surveillance cameras. Personal video recording cameras also contain some form of viewing screen that enables a person holding the camera to visualize what the video camera is recording. Thus, personal video recording cameras are designed to be manually maneuvered in order to have the video camera follow a person or event across a range of view.

Although personal video recording cameras are designed to be manually operated and oriented, many personal video recording cameras do come with infrared remote controls. However, these controls only enable a person to remotely start, stop and zoom the video camera. The remote controls provide no ability to pan the camera across a range of view.

There are many situations where it would be convenient for a person to be able to pan a personal video camera from a remote position. For example, if a parent is sitting in an audience of a school event, it would be rude to stand up in order to clearly video record the event. However, if the parent merely left the personal video recording camera running on a tripod near the stage, the event could be clearly recorded without any inconvenience to others. However, if a person does leave the video camera, that person abandons the ability to manually pan the camera and properly center the event being recorded.

A need therefore exists for a system that enables a person to sit remotely from a personal video camera, yet view the image being recoded by that video camera and pan the camera to control the position of the video camera. In this manner, a personal video camera can be left in an unobstructed position and can be used to clearly record an event by a person sitting in an obstructed position. This need is met by the present invention as described and claimed below.

SUMMARY OF THE INVENTION

The present invention is a pan head system for selectively attaching a video camera to a stand that enables the video camera to be operated and panned from a remote location. The pan head system includes a camera mount for engaging a video camera. The pan head system also has a stand mount for engaging a support stand. A motorized orientation mechanism is disposed between the camera mount and the stand mount for selectively varying an orientation of the camera mount relative the stand mount.

A user interface is provided for controlling the motorized orientation mechanism. The user interface is remote from the motorized orientation mechanism and communicates with the motorized orientation mechanism via a communications link.

In addition to a motorized orientation mechanism, an infrared signal generator can also be provided between the camera mount and the stand mount. The infrared signal generator produces control signals for a video camera that is attached to the camera mount. The infrared signal generator is also controlled by the user interface via the communications link.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Many types and styles of video recording cameras exist. The present invention pan system can be adapted for use with any such video recording camera. It will therefore be understood that the model, shape and size of the video recording camera being illustrated is merely exemplary and should not be considered a limitation of the present invention to other camera types.

Figure 1:
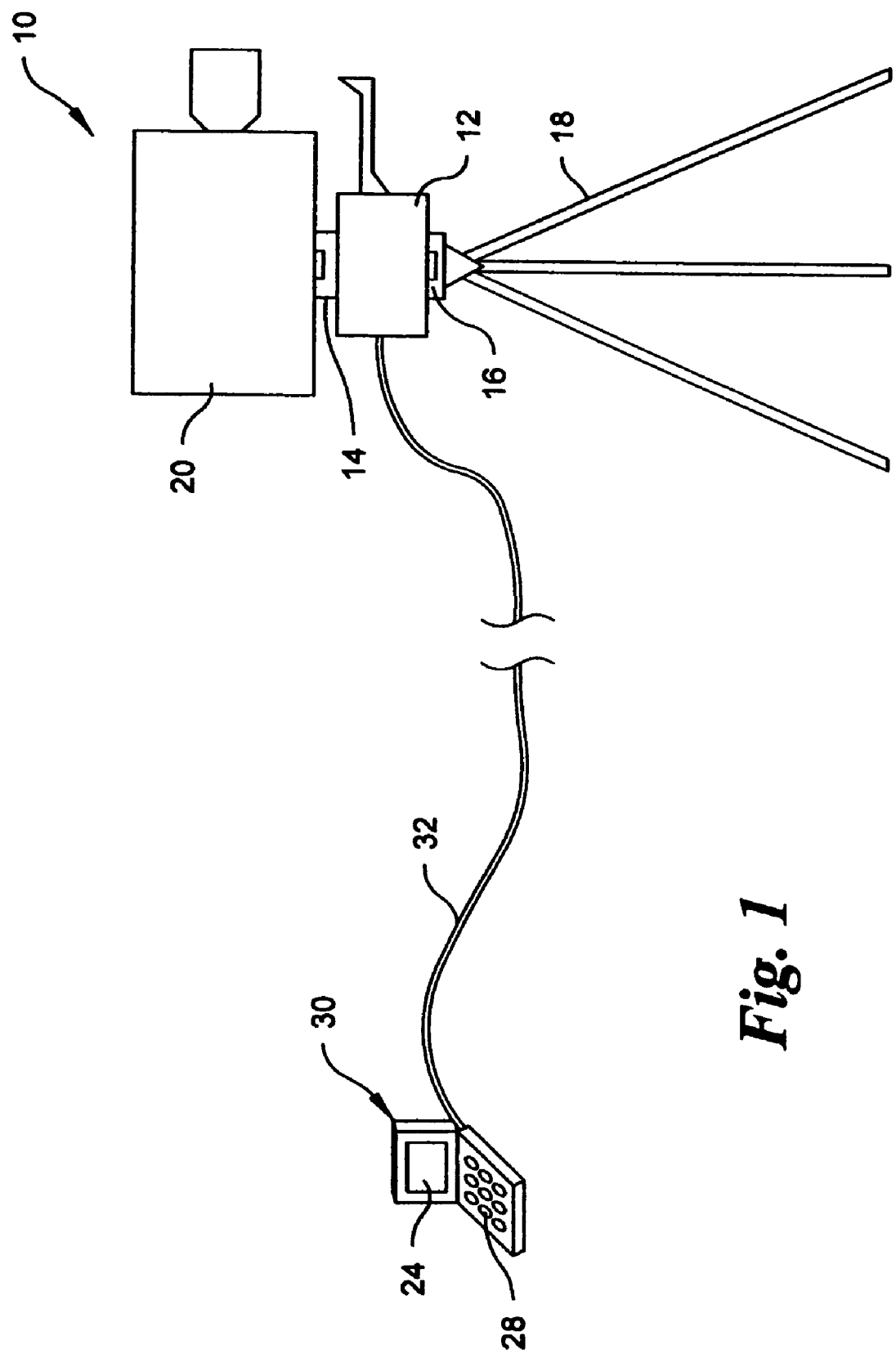
FIG. 1 shows a first exemplary embodiment of the present invention system.

Referring to FIG. 1, there is shown a pan head system 10 in accordance with the present invention. A pan head housing 12 is provided between a video recording camera 20 and a tripod stand 18. At the top of the pan head housing 12 is a camera mount 14 that enables the pan head housing 12 to mount to the base of a video recording camera 20. At the bottom of the pan head housing 12 is a tripod mount 16 that enables the pan head housing 12 to be mounted to the tripod stand 18. As will later be explained, motorized orientation mechanisms are provided within the pan head housing 12 that enable the position of the camera mount 14 to be selectively varied relative the tripod mount 16. Consequently, when the pan head housing 12 is mounted to both the video recording camera 20 and the tripod stand 18, the orientation of the video recording camera 20 on the tripod stand 18 can be selectively controlled.

The motorized orientation mechanisms contained within the pan head housing 12 are controlled by a remote user interface 30. The user interface 30 contains a view screen 24 and positioning controls 28. The view screen 24 displays the image being viewed by the video recording camera 20. The positioning controls 28 provide manual controls so that a user can adjust the roll, pitch and yaw of the video recording camera 20, as well as the zoom and record features of the video recording camera 20.

The user interface 30 is remote from the pan head housing 12 and communicates with the motorized orientation mechanisms within the pan head housing 12 using a communications link. In the embodiment of FIG. 1, the communications link is a long flexible cable 32. However, indirect communications links, such as radio signal links, infrared signal links and cellular telephone links can also be used, as will later be explained in more detail.

A person can therefore set up the video recording camera 20 in a position that is unobstructed relative the event to be recorded. A person can then return to their seat or other obstructed position and remotely control the orientation and operation of the video recording camera 20.

Figure 2:
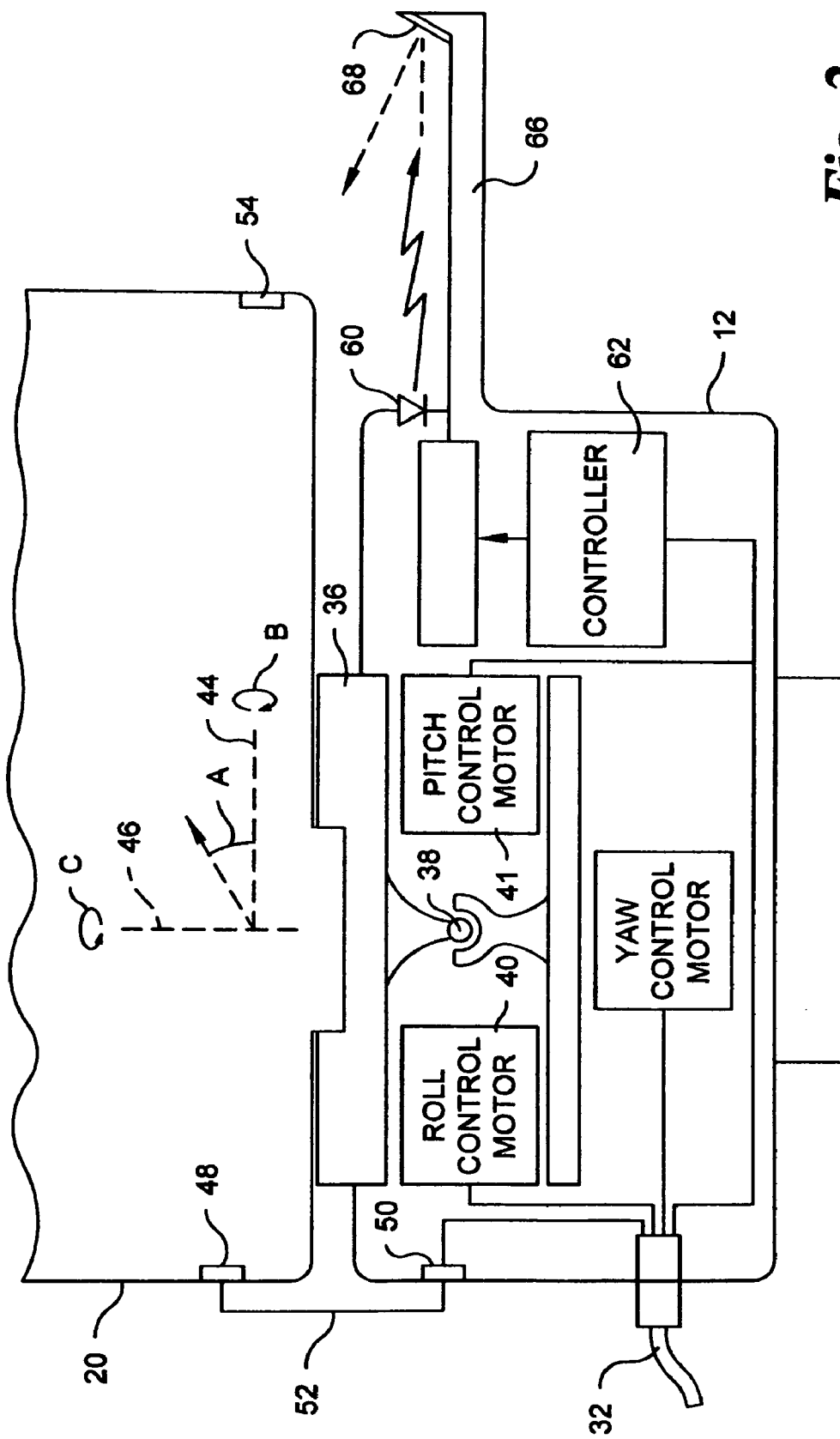
FIG. 2 is a schematic of the embodiment of the present invention system shown in FIG. 1.

Referring to FIG. 2, it can be seen that inside the pan head housing 12 is a platform 36. The camera mount 14 is supported by the platform 36. The platform 36 itself is supported on a gimble joint 38. The gimble joint 38 is engaged by three position control motors. The three control motors include the roll control motor 40, the pitch control motor 41 and the yaw control motor 42. The pitch control motor 41 selectively varies the angle A of the platform 36 relative the horizontal plane. The roll control motor 40 controls the rotation of the platform 36 around a horizontal axis 44, as indicated by arrow B. Lastly, the yaw control motor 42 controls the rotation of the platform 36 around the vertical axis 46. As indicated by arrow C.

The roll control motor 40, the pitch control motor 41 and the yaw control motor 42 are all controlled by the positioning controls 28 (FIG. 1) located on the user interface 30 (FIG. 1). The positioning controls 28 are directly connected to the roll control motor 40, the pitch control motor 41 and the yaw control motor 42 via the flexible cable 32.

Most modern video recording cameras have an audio/visual output port 48 built into the camera. A relay port 50 is provided on the pan head housing 12. The relay port 50 accepts a jumper cable 52 that connects the relay port 50 to the audio/visual output port 48 on the video recording camera. Within the pan head housing 12, the relay port 50 connects to the flexible cable 32. The flexible cable 32 connects the relay port 50 to the view screen 24 (FIG. 1) at the user interface 30 (FIG. 1). In this manner, the view screen 24 is directly connected to the audio/visual output port 48 of the video recording camera 20 and can display the image being viewed by the video recording camera 20.

Many modern video recording cameras also have infrared signal receivers 54 located in the front of the video recording cameras. The infrared signal receiver 54 enables the video recording camera 20 to be turned on/off and zoomed using an infrared remote control.

An infrared light emitting diode (LED) 60 is disposed in the pan head housing 12. The infrared LED 60 can transmit the infrared signals needed to control the video recording camera 20. The infrared LED 60 is connected to an IR signal controller 62 that generates the control signals and causes the infrared LED 60 to flash such control signals. The IR signal controller 62 is coupled to the user interface 30 via the flexible cable 32. Thus, a person using the user interface 30 can cause the IR signal controller 62 to generate the infrared signals needed to activate and/or zoom the video recording camera 20.

The infrared signal receiver 54 on the video recording camera 20 is typically located on the front of the video recording camera 20. In order to ensure the IR signals generated in the pan head housing 12 are received by the infrared signal receiver 54, an extension 66 is provided on the pan head housing 12. The extension 66 positions a reflector, such as a mirror 68, in front of the video recording camera 20. The mirror 68 reflects infrared signals onto the front of the video recoding camera 20 where they can be detected by the video recoding camera 20.

From the schematic of FIG. 2, it will be understood that a person holding the user interface 30 at a remote location can view what the video recording camera is recording. Furthermore, a person can selectively alter the orientation of the video recording camera and can control both the recording and zoom functions of the video recording camera 20. Thus, the video recording camera 20 can be left in an unobstructed position and can be used to record an event by a person sitting or standing in a more obstructed remote location.

Figure 3:
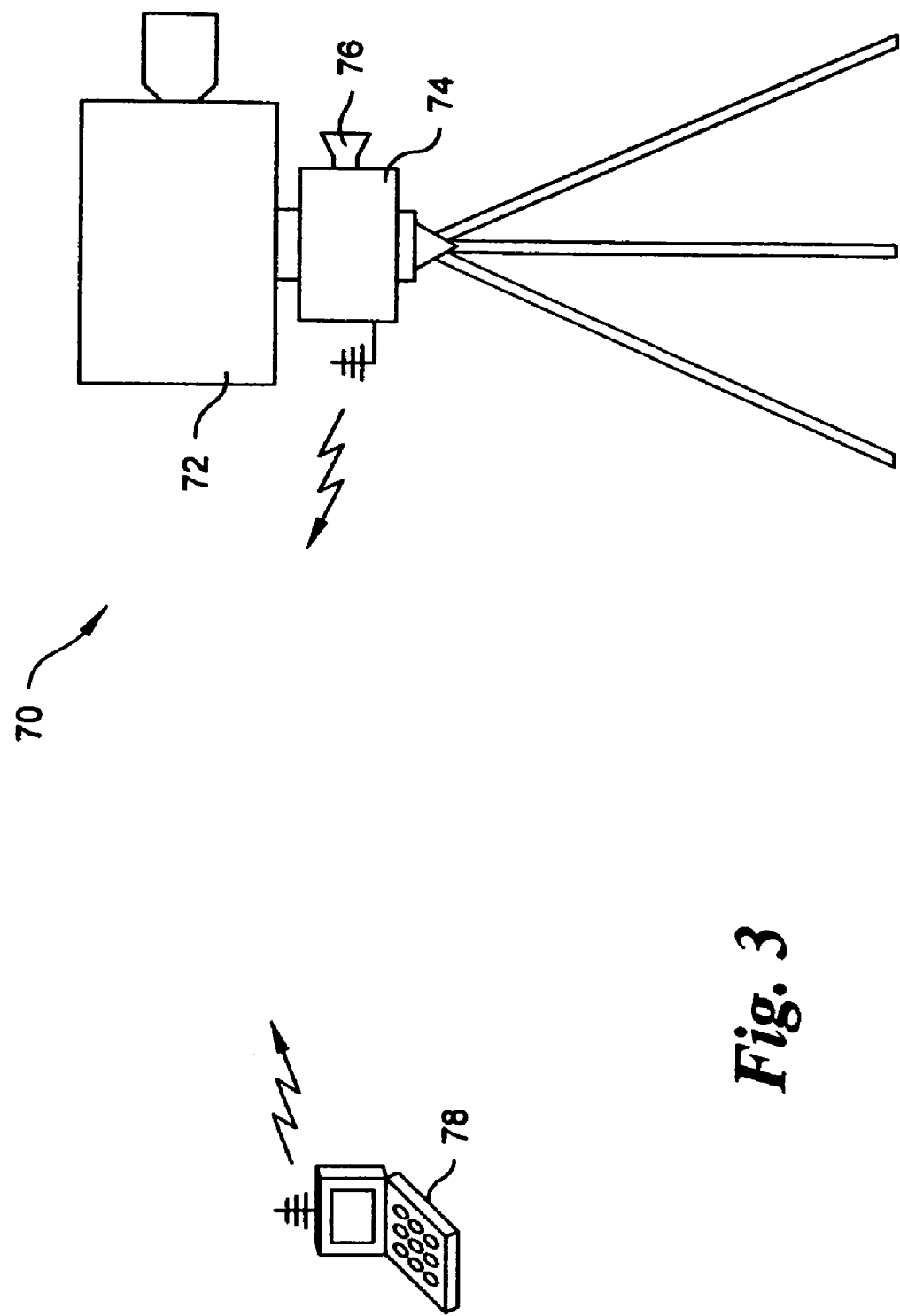
FIG. 3 shows a second exemplary embodiment of the present invention system.

Referring to FIG. 3, an alternate embodiment of the present invention pan system 70 is shown. In this embodiment, the camera being panned is a video recording camera 72 that does not have a video output port. This embodiment can also be used to hold and position digital or film still-frame cameras.

The pan head system 70 includes a pan head housing 74. In the pan head housing 74 is located a secondary imaging camera 76. The imaging camera 76 faces forward. The image viewed by the imaging camera 76 is transmitted back to a user interface 78, via a radio signal link.

Figure 4:
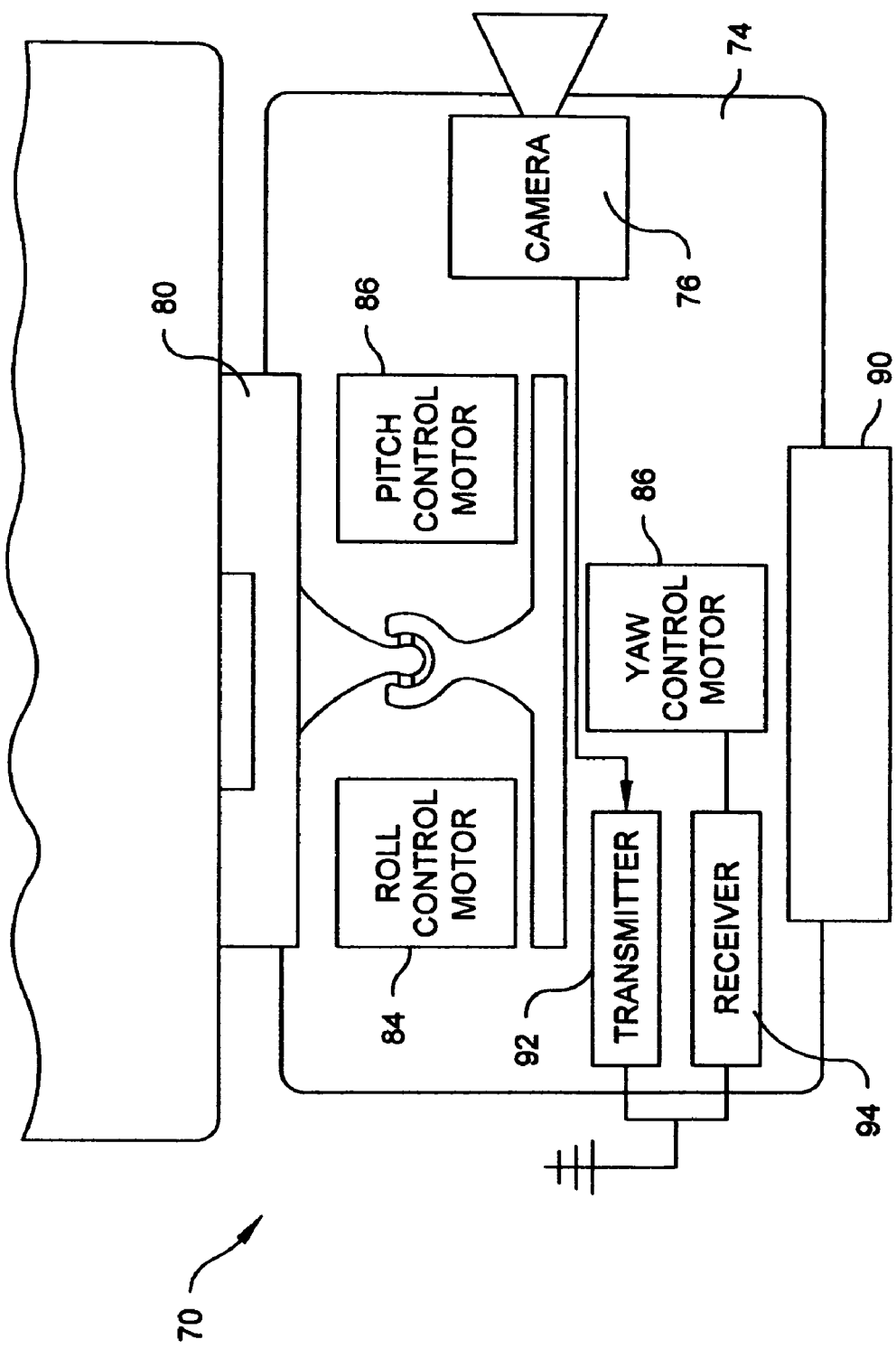
FIG. 4 is a schematic of the embodiment of the system shown in FIG. 3.

Referring to FIG. 4, it can be seen that the pan head system 70 includes a camera mount 80. The camera mount 80 is supported on a gimble joint 82. Thus, the position of the camera mount 80 can be selectively controlled in the manner previously described using a roll control motor 84, a pitch control motor 86 and a yaw control motor 88. At the bottom of the pan head housing 74 is a tripod mount 90. Thus, the camera mount 80 can be selectively moved relative the tripod mount 90 and so the video recording camera 72 can be selectively reoriented.

Within the pan head housing 74 is a transmitter 92 and a receiver 94. The transmitter 92 is coupled to the imaging camera 76 and transmits the image captured by the imaging camera 76 back to the user interface 78 (FIG. 1). The receiver 94 receives control signals from the user interface 78. The control signals are used to activate, zoom and/or reorient the video recording camera 72 in the same manner as was previously explained with reference to the embodiment of FIG. 2.

Figure 5:
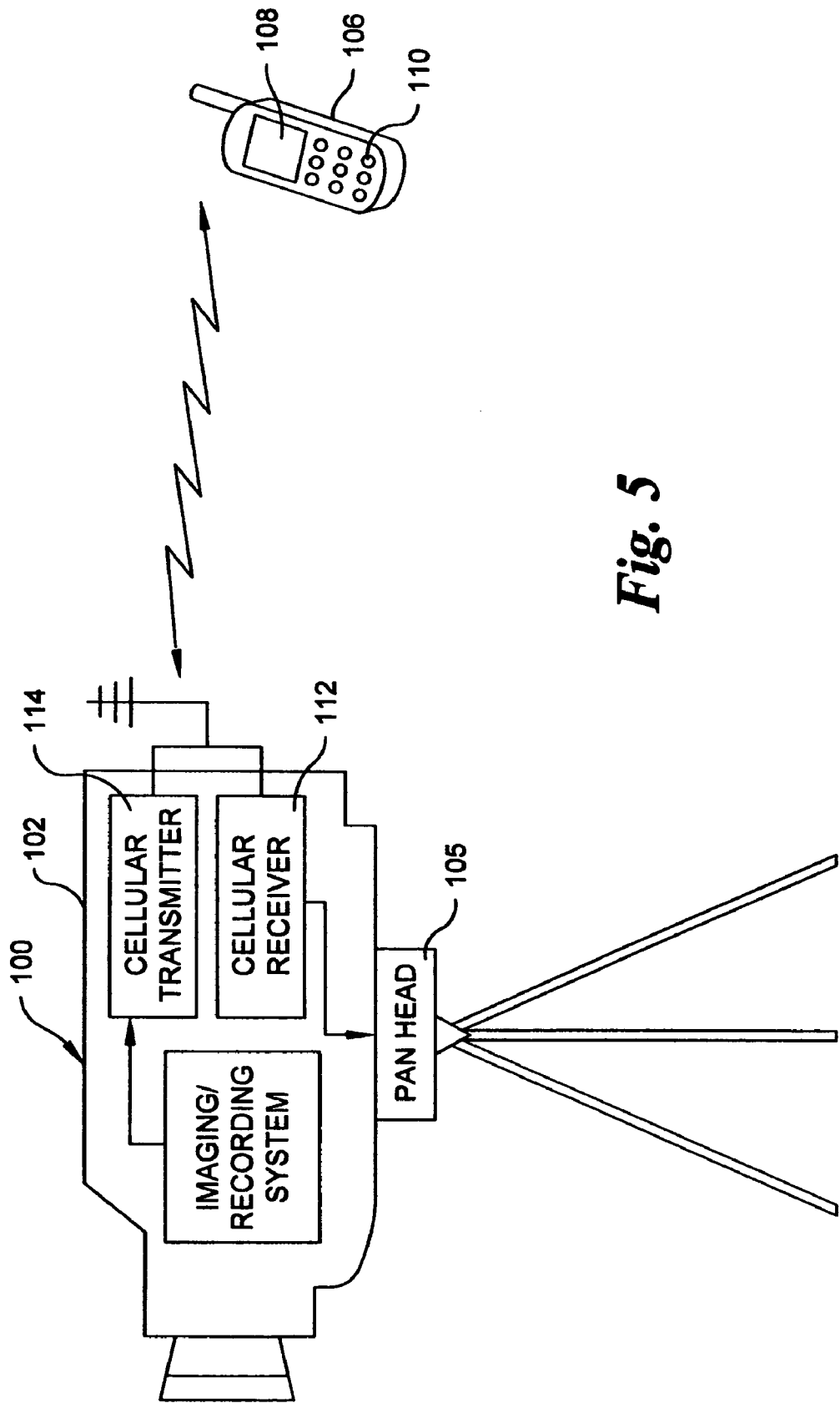
FIG. 5 is a schematic of a third exemplary embodiment of the present invention system.

In the embodiments thus presented, the pan head and the video camera were separate elements. It will be understood that in an alternate embodiment of the present invention the pan head can be integrated into the structure of the video recording camera. Such an embodiment is presented in FIG. 5. Referring to FIG. 5, it can be seen that the video recording camera 100 has a housing 102. At the bottom of the housing 102 is a tripod mount 104. Within the housing 102 is a pan head mechanism 105. The pan head mechanism 105 contains the roll, pitch and yaw motors that can vary the orientation of the tripod mount 104 relative the remainder of the camera housing 102. Thus, the camera housing 102 can move relative the tripod mount 104.

In previous embodiments, the user interface is a dedicated unit designed for use as part of the present invention system. However, this need not be the case. In the embodiment of the present invention system being shown, the user interface 106 is a camera cell phone. Camera cell phones have image displays 108 and function buttons 110 that can be used in the operation of the present invention system.

A cellular receiver 112 and transmitter 114 are contained within the camera housing 102. The transmitter 114 is coupled to the video recording camera 100 and transmits one frame of the image being recorded every few moments. This frame image is transmitted back to the camera cell phone being used as the user interface 106. Thus, a person looking at the image display 108 of the picture cell phone can see what image is being recorded. This image is constantly updated.

The receiver 112 receives command signals from the picture cell phone. The command signals are used to operate, zoom and orient the video recording camera 100. Thus, a person from a different state or even a different country can operate the video recording camera 100 via the cellular telephone communications link.

It will be understood that features from the different described embodiments can be mixed and matched to create alternate embodiments of the present invention. It will also be understood that the embodiments of the present invention that are described and illustrated are merely exemplary and that a person skilled in the art can make many changes to the shown embodiment using functionally equivalent components. For example, there are many pan mechanisms that use universal joints or multiple hinged connections to create the same freedom of movement as would a gimble joint. Any such alternate embodiments of a pan head mechanism can be adapted for use as part of the present invention. What is important to the present invention is to provide the ability to pan a camera from a remote user interface. All such variations, modifications and alternate embodiments are intended to be included within the scope of the present invention as defined by the claims.

What is claimed is:

1. A pan head system for use with a handheld video camera of the type having an auxiliary video output port, said pan head system selectively attaching said video camera to a support stand, said pan head system comprising:
   a housing having a top surface and a bottom surface;
   a camera mount disposed on said top surface of said housing for engaging the video camera;
   a stand mount disposed on said bottom surface of said housing for engaging the support stand;
   a motorized orientation mechanism disposed between said camera mount and said stand mount for selectively varying an orientation of said camera mount relative said stand mount;
   a video cable extending from said housing that is configured to engage the auxiliary video output port on the video camera;
   a user interface that is remote from said housing, wherein said interface includes,
   a view screen that displays images received by said video cable and transmitted to said user interface by a communications link; and
   a controller that controls said motorized orientation mechanism and communicates with said motorized orientation mechanism via said communications link.

2. The system according to claim 1, wherein said communications link is a flexible cable that extends between said user interface and said housing.

3. The system according to claim 1, wherein said communications link is selected from a group consisting of radio signal links, infrared signal links and cellular telephone communications links.

4. The system according to claim 1, wherein said user interface is a cellular telephone.

5. The system according to claim 1, wherein said camera mount has a roll orientation, a pitch orientation and a yaw orientation relative said stand mount, and wherein said orientation mechanism can selectively alter said roll orientation, said pitch orientation and said yaw orientation.

6. The system according to claim 1, further including an infrared signal generator for generating video camera control signals.

7. The system according to claim 6, wherein said infrared signal generator is selectively controlled by said user interface via said communications link.

8. The system according to claim 6, further including a reflector for reflecting said video camera control signals above said camera mount.

9. A remotely controlled video camera system, comprising;
   a portable video recording camera responsive to infrared signals;
   a stand for supporting said video recording camera;
   a pan head mechanism for selectively altering the orientation of said video recording camera relative said stand;
   an infrared signal generator for generating control signals for said video recording camera;
   a reflector for reflecting said control signals toward said video recording camera; and
   a user interface that is remote from said pan head mechanism and said video recording camera, wherein said user interface controls said pan head mechanism and said infrared signal generator via a communications link.

10. The system according to claim 9, wherein said user interface includes a view screen and images generated by said video recording camera are forwarded to said view screen via said communications link.

11. The system according to claim 9, further including a secondary imaging camera coupled to said pan head mechanism.

12. The system according to claim 11, wherein said user interface includes a view screen and images generated by said imaging camera are forwarded to said view screen via said communications link.

13. The system according to claim 9, wherein said communications link is a flexible cable that extends between said user interface and said pan head mechanism.

14. The system according to claim 9, wherein said communications link is selected from a group consisting of radio signal links, infrared signal links and cellular telephone communications links.

15. The system according to claim 14, wherein said user interface is a cellular telephone.

16. A pan head system for selectively attaching a video camera to a support stand, said pan head system comprising:
- a housing having a top surface and a bottom surface;
- a camera mount disposed on said top surface of said housing for engaging the video camera;
- a stand mount disposed on said bottom surface of said housing for engaging the support stand;
- a motorized orientation mechanism disposed between said camera mount and said stand mount for selectively varying an orientation of said camera mount relative said stand mount;
- a secondary imaging camera disposed in said housing;
- a user interface that is remote from said housing, wherein said interface includes;
- a view screen that displays images produced by said secondary imaging camera transmitted to said user interface by a communications link; and
- a controller that controls said motorized orientation mechanism and communicates with said motorized orientation mechanism via said communications link.

\* \* \* \* \*